June 24, 1969  I. H. COHN  3,451,406
POINT SENSOR VOLUMETRIC FILL DEVICE FOR LIQUID CONTAINERS
Filed April 3, 1967
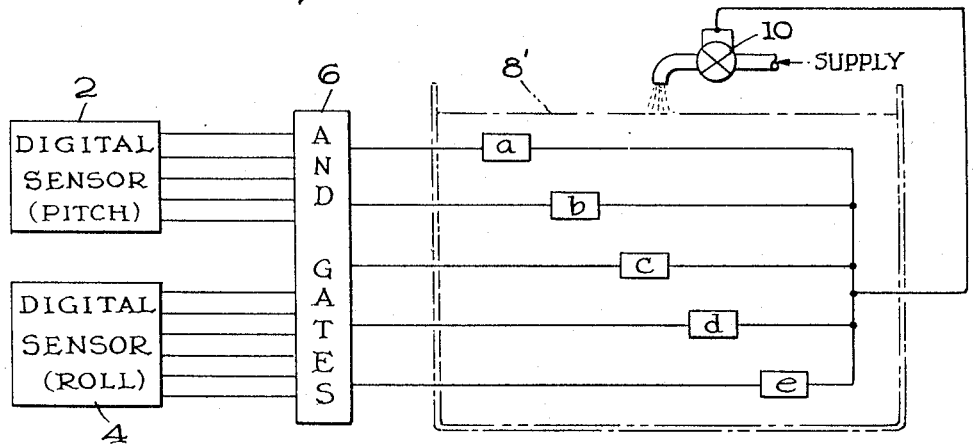
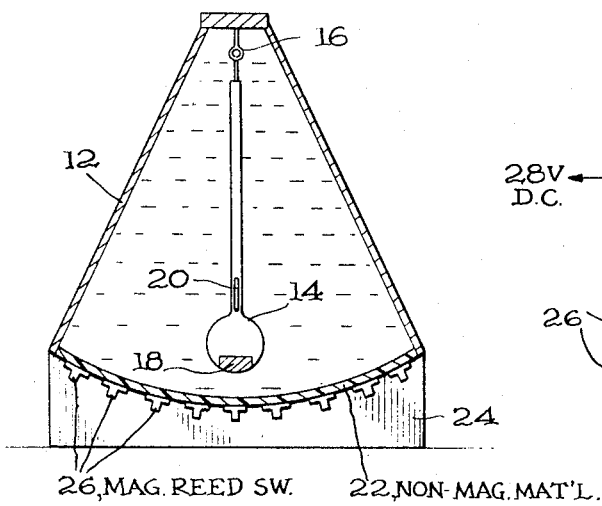
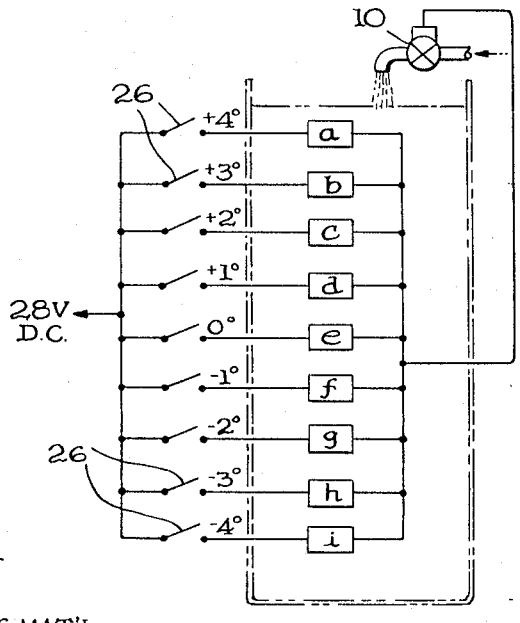
INVENTOR
IRVING H. COHEN
BY Edwin E. Greigg
ATTORNEY

United States Patent Office 3,451,406
Patented June 24, 1969

3,451,406
POINT SENSOR VOLUMETRIC FILL DEVICE FOR LIQUID CONTAINERS
Irving H. Cohn, New York, N.Y., assignor to Simmonds Precision Products, Inc., Tarrytown, N.Y., a corporation of New York
Filed Apr. 3, 1967, Ser. No. 628,051
Int. Cl. G05d 9/00; F16k 21/18; G05b 11/06
U.S. Cl. 137—45                      4 Claims

ABSTRACT OF THE DISCLOSURE

A system for filling a container to a 100% fill with a liquid regardless of the attitude assumed by the container wherein plural point sensors electrically responsive to contact with a liquid are located in the container with each location corresponding to a 100% fill condition for a given attitude and a means for sensing the attitude of the container is provided for energizing only one of the point sensors which in turn controls a shut-off liquid supply valve for the container.

---

This invention relates to a liquid level responsive system for completely filling a container and, more specifically, to such a system which will fill a fuel tank to 100% full for any given position of the tank with respect to the horizontal.

In aircraft it is always desirable, if not necessary, to fill the fuel tanks to 100% fill in order to achieve maximum operability during flight conditions. 100% fill for an aircraft tank always assumes an air space above the level of fuel for allowing subsequent expansion of the fuel. Past methods have proved to be inaccurate because such tanks were filled to a given point defining a given level within the tank with the assumption that the tanks were exactly horizontal. Under actual conditions, however, the ramps upon which aircraft stand during filling operations might assume various angles and a single point system, as above-described, would then be only accurate for one particular attitude of the aircraft, namely, the horizontal. Further, variables in tire inflation, as well as strut deflections, contribute to error. It becomes apparent, then, that the attitude of the fuel tanks with respect to the horizontal is subject to change. These conditions present extreme difficulty in achieving an accurate fill condition for fuel tanks and as the aircraft attitude is varied due to the above-described effects, the fuel level surface varies with respect to the tank walls for the 100% fill condition. It is, therefore, the purpose of this invention to overcome the above difficulties and provide 100% full condition for fuel tanks regardless of their attitude.

According to one embodiment embracing the principles of this invention, there is provided a group of point sensors mounted on the walls of the fuel tank such that each single sensor is associated with 100% fill condition at a given particular pitch and roll of the aircraft. These point sensors are associated with an attitude sensing means in order that the level of the fuel surface may be defined at any required attitude by a single selected point sensor. To this end the attitude sensing means will provide attitude information which, through appropriate circuitry, will activate a particular point sensor associated with the particular attitude sensed to the exclusion of all the remaining point sensors. During a fueling operation, the fuel level will reach the location of this particular point sensor, which will then activate a circuit for shutting off the fueling valve at 100% fill condition.

Accordingly, it is the object of this invention to provide a system for filling containers with a fluid to a fill condition regardless of the attitude assumed by the container to be filled.

It is another object of this invention to provide a system for filling a container to a full condition by closing a shut-off supply valve in response to an attitude sensing device for the container to be filled.

It is yet another object of this invention to provide a plurality of liquid level responsive point sensors mounted on the walls of a container and associated with an attitude sensing device such that the surface of the liquid level may be defined at any given attitude of the container by a single selected point sensor.

Other objects and advantages will become apparent from a study of the following specifications and drawings, in which:

FIG. 1 is a schematic diagram illustrating the point sensor volumetric fill system according to the principles of this invention;

FIG. 2 shows a further embodiment of a type of attitude sensing means employed in the system according to the principles of this invention; and FIG. 3 is a schematic diagram illustrating the switching circuitry employing the attitude sensing means illustrated in FIG. 2.

Referring now to FIG. 1, there is shown an attitude sensing device in the form of a digital pitch sensor 2 and a digital roll sensor 4, both of which feed a series of AND gates 6. By way of one example, there are shown five leads from each of the sensors 2 and 4 which combine to feed five AND gates, each gate having an output connected to a suitable point thermistor, five of which are shown as a, b, c, d, and e. The point thermistors are mounted in a predetermined manner on the walls of a container 8, for example, each thermistor will be mounted at a level defining 100% fill for the container 8 at a given pitch and roll of the container, or of the aircraft in which the container is located. Each of the thermistors a–e is of conventional design for conducting current at a given temperature but upon contact with a medium of different temperature, it will change its resistance to allow or prevent current flow, whichever the case may be. In the embodiment shown only five point thermisters are employed; however, any number of thermistors may be employed, the greater number contributing to greater accuracy in the relation between the actual attitude of the container and 100% fill condition for the container. The thermistors a–e are connected in parallel, as shown, between the AND gates 6 and a liquid shut-off valve 10 for supplying liquid to the container 8. The valve 10 is of conventional design and may be, suitably, an electromagnetically operated valve or the like.

The operation of the system is as follows: The container 8 is empty and therefore ready to be filled. If the container is a fuel tank located in an aircraft, it will be oriented according to a particular attitude, that is, according to a certain pitch and roll of the aircraft. Pitch and roll attitudes are understood to be the attitude of a plane surface through the fuel tank which is parallel to the ground when the aircraft is at ground attitude. The actual combination of pitch and roll of the stationary aircraft will be sensed by the digital sensors 2 and 4 which will then energize the appropriate AND gate. In this manner, any one of the AND gates can be energized by the combined signal from both the pitch sensor and the roll sensor reflecting the actual attitude of the aircraft. The particular AND gate which is energized will then, in turn, energize its associated thermistor point sensor a, b, c, d, or e, while all of the remaining point sensors will be de-energized. During the fueling operation, the de-energized thermistors will not be affected by contact with the fuel, but when the fuel level 8' reaches the energized thermistor, it will cause the same to change its resistance and hence conduct current and activate the fuel shut-off valve 10 to which it is connected in circuit.

FIG. 2 shows a system utilizing a further embodiment of the attitude sensing device wherein a closed container 12 is provided with a suitable damping fluid such as silicone oil, or the like. Suspended from the top of the container is a pendulum 14 pivoted at 16 for arcuate motion along a non-magnetic surface 22. At the base of the pendulum is located by suitable means a permanent magnet insert 18. Located underneath the surface 22 in alignment with the arcuate swing of the pendulum 14 are a series of equally spaced-apart magnetic reed switches 26 which remain normally open, but upon the influence of the magnetic field emanating from the magnet 18 become closed. The switches 26 are of conventional design as understood by those skilled in the art.

In FIG. 3 the magnetic reed switches 26 are shown schematically, each switch corresponding to a given pitch within the range of −4° to +4°. When a given switch 26 is energized under the influence of the magnet 8 for a given pitch of the container, or aircraft, as defined by the position of the pendulum 14, one of the associated thermistors a–i will also be energized, in the manner above-described, for activating the fuel shut-off valve 10. It should be understood that the circuit shown in FIG. 3 is operative for only one axis of attitude change. However, a two axis system can be implemented by employing an additional pendulum device having an arcuate movement 90° removed from that shown in FIG. 2.

In the event power is not available when the aircraft is being fueled the system, according to FIGS. 2 and 3, can be powered by an internal battery supply of 28 volts, as shown. It is also contemplated that the system according to this invention can utilize a battery charging apparatus which would act to re-charge the battery when the aircraft's power is on during flight conditions.

That which is claimed is:

1. A system for sensing a predetermined level of liquid within a container for a given attitude of said container comprising, a plurality of liquid level sensing elements electrically responsive to contact with a liquid and positioned at different locations within said container, each location corresponding to a fill condition level for a given attitude of said container, an electrically actuable shut-off supply valve for said container, and attitude sensing selector means for connecting in circuit with said shut-off valve only one of said elements, whereby said shut-off valve is actuated when the liquid reaches the level defined by the location of said one of said elements.

2. A system for sensing a predetermined level of liquid within a container for a given attitude of said container comprising: a plurality of liquid level sensing elements being electrically responsive to contact with a liquid and positioned at different locations within said container, each of said locations corresponding to a fill condition level for a given attitude of said container, an electrically actuable shut-off supply valve for said container, an electric power source for said shut-off valve, switching means for connecting in circuit with said shut-off supply valve only one of said elements, an attitude sensing means for closing said switching means and energizing said one of said elements for actuating said shut-off supply valve, whereby said container assumes a fill condition at the level defined by the location of said one of said elements.

3. The system according to claim 2, wherein said switching means comprises an arcuate array of magnetic reed switches and said attitude sensing means comprises a pivotally mounted pendulum having a magnetic field emanating means secured thereto for swinging in proximity to said arcuate array of switches.

4. A system for sensing a predetermined level of liquid within a container for a given attitude of said container comprising: a plurality of liquid level sensing elements being electrically responsive to contact with a liquid and positioned at different locations within said container, each location corresponding to a fill condition level for a given attitude of said container, an electrically actuable shut-off supply valve for said container, a plurality of switches, each of said switches connected to one of said elements, and means connected in circuit with said switches for closing only one of said switches and energizing said one of said elements in response to a given attitude of said container, whereby said shut-off supply valve is actuated when the liquid reaches the level defined by the location of said one of said elements in said container.

References Cited

UNITED STATES PATENTS

| | | | |
|---|---|---|---|
| 2,394,853 | 2/1946 | Goddard | 137—38 |
| 2,411,728 | 11/1946 | Hunter | 137—44 X |
| 2,498,232 | 2/1950 | Andrews | 137—392 |
| 2,655,933 | 10/1953 | Odell | 137—392 |
| 2,763,283 | 9/1956 | Griffith | 137—392 |
| 2,766,406 | 10/1956 | Schwarzkopf | 137—392 X |
| 2,996,915 | 8/1961 | Greenwood | 137—392 X |
| 3,157,196 | 11/1964 | Thomas | 137—45 X |
| 3,285,275 | 11/1966 | Couffer | 137—392 |

FOREIGN PATENTS 11,358  5/1907  Great Britain.

LOUIS G. MANGENE, *Primary Examiner.*

U.S. Cl. X.R.

137—38, 392